United States Patent
Byun et al.

(10) Patent No.: US 10,566,664 B2
(45) Date of Patent: *Feb. 18, 2020

(54) METHOD FOR PRODUCING LITHIUM PHOSPHATE FROM A LITHIUM SOLUTION

(71) Applicant: SUNGEEL HITECH CO., LTD., Jeollabuk-do (KR)

(72) Inventors: Suk-Hyun Byun, Jeollabuk-do (KR); Kang-Myung Yi, Seoul (KR); Ki-Woong Lee, Gyeonggi-do (KR); Kwang-Joong Kim, Jeollabuk-do (KR); Woo-Young Jung, Jeollabuk-do (KR)

(73) Assignee: SUNGEEL HITECH CO., LTD., Jeollabuk-do (KR)

( * ) Notice: Subject to any disclaimer, the term of this patent is extended or adjusted under 35 U.S.C. 154(b) by 204 days.

This patent is subject to a terminal disclaimer.

(21) Appl. No.: 15/692,266

(22) Filed: Aug. 31, 2017

(65) Prior Publication Data
US 2018/0166753 A1 Jun. 14, 2018

(30) Foreign Application Priority Data
Dec. 14, 2016 (KR) .......................... 10-2016-0170421

(51) Int. Cl.
*H01M 10/54* (2006.01)
*C01D 15/00* (2006.01)
*C22B 7/00* (2006.01)

(52) U.S. Cl.
CPC ............ *H01M 10/54* (2013.01); *C01D 15/00* (2013.01); *C22B 7/008* (2013.01)

(58) Field of Classification Search
CPC .............................. H01M 10/54; C01B 25/30
See application file for complete search history.

(56) References Cited

U.S. PATENT DOCUMENTS

| 2,608,465 A | 8/1952 | May | |
| 2015/0013499 A1* | 1/2015 | Asano | C22B 3/0005 75/739 |
| 2017/0084965 A1* | 3/2017 | Song | H01M 10/54 |
| 2018/0170763 A1* | 6/2018 | Byun | C01D 15/08 |

FOREIGN PATENT DOCUMENTS

| JP | 2011168461 A | 9/2011 |
| JP | 2011168858 A | 9/2011 |
| JP | 2016528140 A | 9/2016 |
| KR | 20120063424 A | 6/2012 |

(Continued)

OTHER PUBLICATIONS

Korean Notice of Allowance, Korean Publication No. 1020170250479, Dated Aug. 10, 2017.

*Primary Examiner* — Matthew J Merkling
(74) *Attorney, Agent, or Firm* — Heslin Rothenberg Farley & Mesiti P.C.; George S. Blasiak, Esq.

(57) ABSTRACT

An embodiment of the present invention provides a method for producing lithium phosphate from a lithium solution, comprising the steps of, preparing a mixture in which a phosphorus-containing material is added to a lithium solution in step 1; adding a basic solution to the prepared mixture to adjust the pH to 10 to 12 in step 2; and making the pH-adjusted mixture react by raising its temperature and filtering to recover lithium phosphate in step 3.

12 Claims, 7 Drawing Sheets

(56) References Cited

FOREIGN PATENT DOCUMENTS

| KR | 20140126943 A | 11/2014 |
| KR | 20150002963 A | 1/2015 |
| KR | 1020160002579 A | 1/2016 |
| KR | 101604954 B1 | 3/2016 |
| WO | WO 2016130790 A1 | 8/2016 |

* cited by examiner

METHOD FOR PRODUCING LITHIUM PHOSPHATE FROM A LITHIUM SOLUTION

CROSS-REFERENCE TO RELATED APPLICATIONS

This application claims the priority of Korean Patent Application No. 10-2016-0170421 filed on Dec. 14, 2016, and all the benefits accruing therefrom under 35 U.S.C. § 119, the content of which is incorporated by reference in its entirety.

BACKGROUND OF THE INVENTION

Field of the Invention

The present invention relates to method for producing lithium phosphate from a lithium solution.

Description of the Related Art

Recently, attention has been focused on a method for recovering expensive lithium compounds. As a widely known method for recovering a lithium compound, there is a method of dissolving a positive electrode material of a waste lithium secondary battery using a strong acid such as nitric acid, sulfuric acid, hydrochloric acid, and the like, and then performing a neutralization reaction to separate and recover lithium and other metal compounds (Korean Laid-Open Patent Publication No. 10-2014-0126943). However, the above-described recovery method requires expensive chemicals and additional processes must be performed to solve the environmental problems caused by the use of acid, which is pointed out as a problem in that it is not economical.

SUMMARY OF THE INVENTION

Accordingly, the present invention has been made keeping in mind the above problems occurring in the prior art, and an object of the present invention is to provide a method for producing lithium phosphate which is economical, environmentally friendly, and exhibits a high lithium recovery rate by recovering, lithium phosphate by adding a phosphorus-containing, material to a lithium solution.

In order to achieve the above object, according to one aspect of the present invention, a method for producing lithium phosphate from a lithium solution is provided, including the steps of, preparing a mixture in which a phosphorus-containing material is added to a lithium solution in step 1; adding a basic solution to the prepared mixture to adjust the pH to 10 to 12 in step 2; and making the pH-adjusted mixture react by raising its temperature and filtering to recover lithium phosphate in step 3.

In one embodiment, the lithium solution of step 1 may be a waste solution of a waste lithium battery.

In one embodiment, the lithium concentration of the lithium solution of step 1 may be from 1.5 g/L to 6.0 g/L.

In one embodiment, the phosphorus-containing material of step 1 may comprise phosphoric acid ($H_3PO_4$) or phosphate.

In one embodiment, the phosphorus-containing material addition ratio of step 1 may be 0.8 to 1.2 times the lithium equivalent of the lithium solution.

In one embodiment, the basic solution of step 2 is a basic solution including one or more selected from a group consisting of sodium hydroxide (NaOH), potassium hydroxide (KOH), magnesium hydroxide ($Mg(OH)_2$) and calcium hydroxide ($Ca(OH)_2$).

In one embodiment, the addition of the basic solution of step 2 may be performed such that the pH of the mixture is from 10.5 to 11.5.

In one embodiment, the temperature rise in step 3 may be performed by raising the temperature to 70° C. to 90° C. and may be made to react by maintaining the temperature for 30 minutes to 90 minutes alter raising the temperature.

In one embodiment, the filtration of step 3 may recover lithium phosphate containing 85 wt % to 98 wt % of lithium with respect to lithium in the lithium solution of step 1.

According to another aspect of the present invention, a method for producing lithium phosphate from a lithium solution is provided, including the steps of, preparing a mixture in which phosphoric acid is added to a lithium solution in step i; adding a basic solution to the prepared mixture to adjust the pH to 10 to 12 in step ii; and making the pH-adjusted mixture react by raising its temperature to 70° C. to 00° C. and filtering to recover lithium phosphate in step iii.

Further, in order to achieve the above object, according to another aspect of the present invention, a method for producing lithium phosphate from a waste solution from a waste battery containing lithium is provided, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a; adding sodium hydroxide to the prepared mixture to adjust the pH to 10 to 12 in step b; and raising the temperature of the pH-adjusted mixture to 70° C. to 90° C. and making it react for 30 to 90 minutes and filtering to recover lithium phosphate containing 85 wt % to 98 wt % of lithium with respect to lithium in the waste solution of step a in step c.

Further, in order to achieve the above object, according to another aspect of the present invention, lithium phosphate produced through any one of the above-mentioned methods is provided, wherein the lithium phosphate comprises 85 wt % to 98 wt % of lithium with respect to the lithium content in the lithium waste solution which is a starting material at the time of the production.

According to an aspect of the present invention, lithium phosphate containing 85 wt % to 98 wt % of lithium with respect to lithium in the lithium solution can be recovered.

It should be understood that the effects of the present invention are not limited to the above effects and include all effects that can be deduced from the detailed description of the present invention or the configuration of the invention described in the claims.

DETAILED DESCRIPTION OF THE INVENTION

Exemplary embodiments of the present disclosure will be described in detail below with reference to the accompanying drawings.

The advantages and/or features of the present invention and the manner of achieving them will become apparent by referring to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

Also, in the following description of the present invention, a detailed description of a configuration that is considered to unnecessarily obscure the gist of the present invention, for example, a known technology including the prior art, may be omitted.

Figure 1:
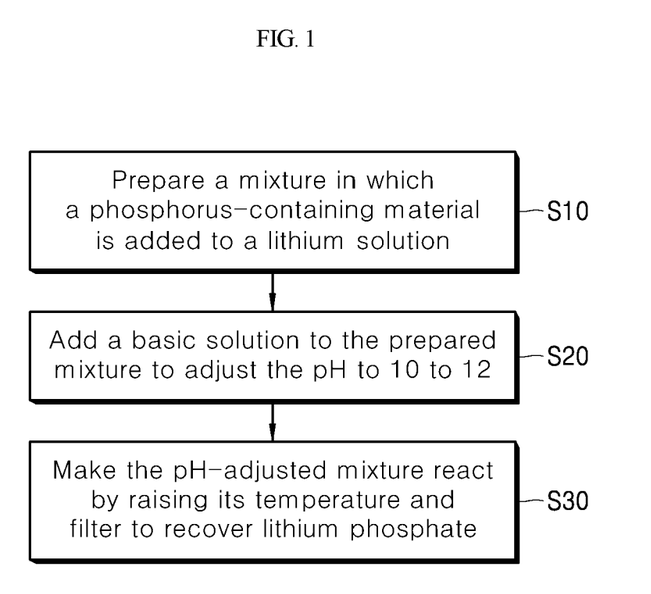
FIG. 1 is a flowchart showing an example of a method for producing lithium phosphate from a lithium solution according to an embodiment of the present invention.
Figure 2:
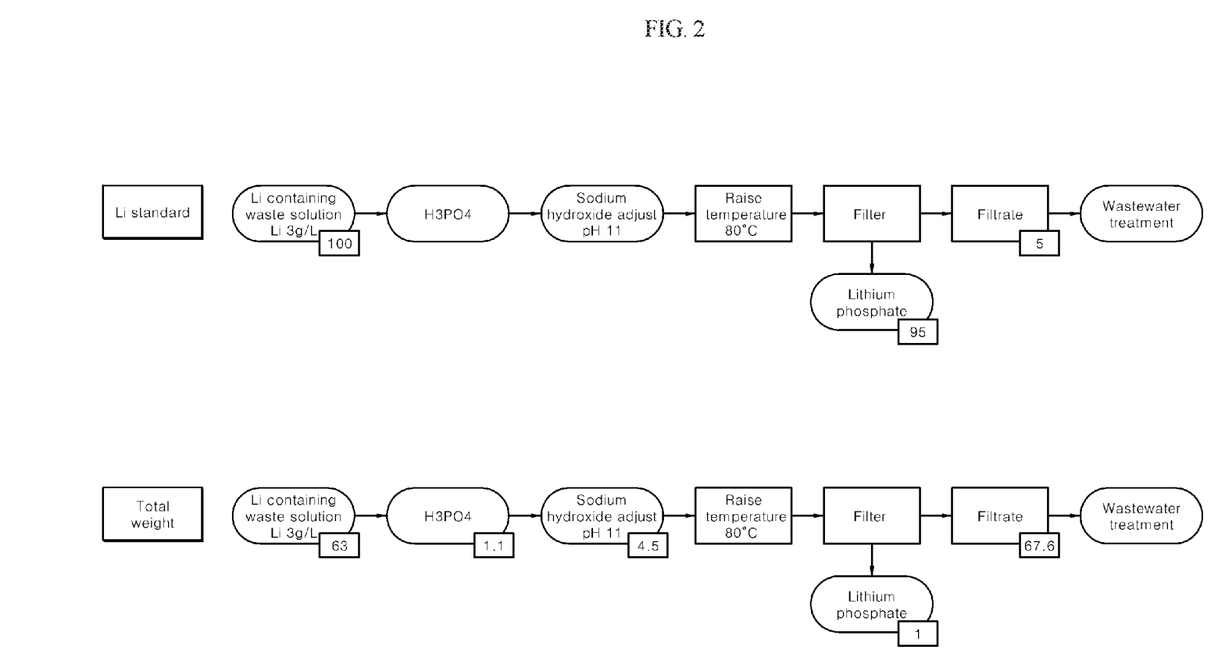
FIG. 2 is a flowchart showing the method for producing lithium phosphate, the lithium-based weight ratio of each step, and the total weight ratio of Example 1 of the present invention.

According to an aspect of the present invention, a method for producing lithium phosphate from a lithium solution is provided, including the steps of, preparing a mixture in which a phosphorus-containing material is added to a lithium solution in step 1 in S10;

adding a basic solution to the prepared mixture to adjust the pH to 10 to 12 in step 2 in S20; and making the pH-adjusted mixture react by raising its temperature and filtering to recover lithium phosphate in step 3 in S30.

Hereinafter, an example of a method for producing lithium phosphate from a lithium solution according to one aspect of the present invention will be described in detail for each step.

In the method for producing lithium phosphate from a lithium solution according to an aspect of the present invention, a mixture where a phosphorus-containing material is added to a lithium solution is prepared in step 1 in S10.

The lithium solution of step 1 may be a waste solution of a waste lithium battery.

The lithium concentration of the lithium solution of step 1 may be from 1.5 g/L to 6.0 g/L, and preferably from 1.5 g/L to 3.5 g/L. If the lithium concentration is less than 1.5 g/L, the lithium recovery rate may decrease in the filtration step described later. If the lithium concentration is more than 6.0 g/L, it may be economical to recover lithium carbonate by evaporation concentration.

The phosphorus-containing material of step 1 may comprise phosphoric acid ($H_3PO_3$) or phosphate, and the phosphate may be one or more selected from a group consisting of potassium phosphate, sodium phosphate, aluminum phosphate, zinc phosphate, ammonium polyphosphate and sodium hexametaphosphate and the like, and preferably a phosphorus-containing material containing phosphoric acid can be used.

The addition ratio of the phosphorus-containing material in step 1 may be 0.8 to 1.2 times, preferably 0.9 to 1.1 times, the lithium equivalent of the lithium solution. If the phosphorus-containing material is added in an equivalent amount less than 0.8 times the lithium of the lithium solution, the recovery rate of lithium may be lowered in the filtration step to be described later. If the phosphorus-containing material is added in an equivalent amount more than 1.2 times the lithium of the lithium solution, the use of excessive phosphorus-containing material can result in economic waste and increased wastewater treatment costs.

In the method for producing lithium phosphate from the lithium solution according to one aspect of the present invention, a basic solution is added to the prepared mixture to adjust the pH to 10 to 12 in step 2 in S20.

The basic solution of step 2 is a basic solution including one or more selected from a group consisting of sodium hydroxide (NaOH), potassium hydroxide (KOH), magnesium hydroxide ($Mg(OH)_2$) and calcium hydroxide ($Ca(OH)_2$).

The basic solution of step 2 may be added so that the pH of the mixture is 10 to 12, preferably 10.5 to 11.5. If the pH of the mixture is less than 10, a problem may occur where the recovery rate is lowered. If the pH of the mixture is more than 12, first, a side effect of decrease in recovery rate may occur. This may result in the formation of a very small amount of lithium hydroxide due to the addition of a large amount of sodium hydroxide and may result in an increase in the Li concentration in the lithium recovery filtrate due to the solubility of the formed lithium hydroxide. Next, the amount of sodium hydroxide used to raise the pH to 12 or higher is, 5.25 times as much for pH 13 and 10 times as much for pH 13.5, as that of pH 11, and so the process cost may increase due to the increase in the amount of drug being used, and also, there is a problem of increase in wastewater treatment costs due to excessive use of sodium hydroxide and an increase in waste disposal costs due to increase of process sludge.

In the method for producing lithium phosphate from the lithium solution according to one aspect of the present invention, the temperature of the pH-adjusted mixture is raised to make it react and filtered to recover lithium phosphate in step 3 in S30.

The temperature rise in step 3 may be performed by raising the temperature to 70° C. to 90° C. and may be made to react by maintaining the temperature for 30 minutes to 90 minutes after raising the temperature. At this time, the lithium phosphate solid component can be easily produced by the reaction.

The filtration in step 3 above can recover the solid lithium phosphate produced in the reaction and the remaining filtrate can be treated as wastewater.

The filtration of step 3 may recover lithium phosphate containing 85 wt % to 98 wt % of lithium with respect to lithium in the lithium solution of step 1, and preferably lithium phosphate containing 95 wt % to 98 wt % of lithium with respect to lithium in the lithium solution of step 1, can be recovered.

Step 3 may further include washing the lithium phosphate recovered by the filtration.

The lithium phosphate produced by the above-described method (steps 1 to 3, S10 to S30) can be used as a raw material in a process for producing lithium carbonate.

The method for producing lithium phosphate from the lithium solution according to one aspect of the present invention may not include the step of removing organic matter that may remain in the lithium solution.

According to another aspect of the present invention, a method for producing lithium phosphate from a lithium solution is provided, including the steps of, preparing a mixture in which phosphoric acid is added to a lithium solution in step i;

adding a basic solution to the prepared mixture to adjust the pH to 10 to 12 in step ii; and making the pH-adjusted mixture react by raising its temperature to 70° C. to 90° C. and filtering to recover lithium phosphate in step iii.

In the method for producing lithium phosphate from the lithium solution according to one aspect of the present invention, step i produces a mixture in which phosphoric acid is added to lithium solution.

The lithium concentration of the lithium solution of step i may be the same as the lithium concentration of the lithium solution of step 1 above.

The lithium solution of step i may be a waste solution of a waste lithium battery.

The added amount of the phosphoric acid in step i may be the same as the added amount of the phosphorus-containing material in step 1.

In the method for producing lithium phosphate from the lithium solution according to one aspect of the present invention, step ii is a step of adjusting the pH to 10 to 12 by adding a basic solution to the prepared mixture.

The basic solution of step ii may be the same as the basic solution of step 2 above.

The basic solution of step ii may be added so that the pH of the mixture becomes 10 to 12, preferably 10.5 to 11.5. If the pH of the mixture is less than 10, there may be a problem that the recovery rate is lowered. If the pH of the mixture is more than 12, first a side effect of decrease in recovery rate may occur. This may result in the formation of a very small amount of lithium hydroxide due to the addition of a large amount of sodium hydroxide and may result in an increase in the Li concentration in the lithium recovery filtrate due to the solubility of the formed lithium hydroxide. Next, the amount of sodium hydroxide used to raise the pH to 12 or higher is, 5.25 times as much for pH 13 and 10 times as much for pH 13.5, as that of pH 11, and so the process cost may increase due to the increase in the amount of drug being used, and also, there is a problem of increase in wastewater treatment costs due to excessive use of sodium hydroxide and an increase in waste disposal costs due to increase of process sludge.

In the method for producing lithium phosphate from a lithium solution according to one aspect of the present invention, the pH-adjusted mixture is made to react by raising its temperature to 70° C. to 90° C. and filtering to recover lithium phosphate in step iii.

The reaction time at the time of raising the temperature in step iii may be the same as the step 3.

The filtration in step iii can recover the lithium phosphate as in step 3 and treat the remaining filtrate as wastewater.

The lithium content of the lithium phosphate recovered in step iii may be the same as the content of step 3.

Step iii may further include washing the recovered lithium phosphate as in step 3.

The lithium phosphate produced by the above method can be used as a raw material in a process for producing lithium carbonate.

According to another aspect of the present invention, a method for producing lithium phosphate from a waste solution from a waste battery containing lithium is provided, including the steps of, preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a;

adding sodium hydroxide to the prepared mixture to adjust the pH to 10 to 12 in step b; and raising the temperature of the pH-adjusted mixture to 70° C. to 90° C. and making it react for 30 to 90 minutes and filtering to recover lithium phosphate containing 85 wt % to 98 wt % of lithium with respect to lithium in the waste solution of step a in step c.

The basic solution of step b may be added so that the pH of the mixture becomes 10 to 12, preferably 10.5 to 11.5. If the pH of the mixture is less than 10, there may be a problem that the recovery rate is lowered. If the pH of the mixture is more than 12, first, a side effect of decrease in recovery rate may occur. This may result in the formation of a very small amount of lithium hydroxide due to the addition of a large amount of sodium hydroxide and may result in an increase in the Li concentration in the lithium recovery filtrate due to the solubility of the formed lithium hydroxide. Next, the amount of sodium hydroxide used to raise the pH to 12 or higher is, 5.25 times as much for pH 13 and 10 times as much for pH 13.5, as that of pH 11, and so the process cost may increase due to the increase in the amount of thug being used, and also, there is a problem of increase in wastewater treatment costs due to excessive use of sodium hydroxide and an increase in waste disposal costs due to increase of process sludge.

In the filtration of step c, lithium phosphate may be recovered as in step 3 and the remaining filtrate may be subject to wastewater treatment.

Step c may further include washing the recovered lithium phosphate as in the step 3.

The lithium phosphate produced by the above method can be used as a raw material in a process for producing lithium carbonate.

According to another aspect of the present invention, a lithium phosphate produced by any one of the above-mentioned methods for producing lithium phosphate is provided.

The produced lithium phosphate may be lithium phosphate comprising 85 wt % to 98 wt % of lithium with respect to the lithium content in the lithium waste solution which is a starting material at the time of the production.

Hereinafter, the present invention will be described in more detail with reference to examples and experimental examples. However, the following examples and experimental examples are for illustrative purposes only and are not intended to limit the scope of the present invention.

<Example 1> Production Process of Lithium Phosphate

Step 1: 10 tons of a lithium waste solution (lithium concentration: 3 g/L) of a waste lithium secondary battery was provided. Phosphoric acid was added to the waste solution at a molar equivalent (180 kg) with respect to the lithium.

Step 2: 720 kg of sodium hydroxide (20% concentrations) was added to the phosphoric acid-added waste solution to adjust the pH to 11.

Step 3: The temperature of the pH-adjusted waste solution was raised to a temperature of 80° C., made to react for 1 hour, and then filtered to collect lithium phosphate, which was washed with distilled water.

<Example 2> Production Process of Lithium Phosphate, pH 10

Lithium phosphate was produced in the same manner as in Example 1, except that in step 2 of Example 1, the pH was adjusted to 10.

<Example 3> Production Process of Lithium Phosphate, pH 12

Lithium Phosphate was produced in the same manner as in Example 1, except that in step 2 of Example 1, the pH was adjusted to 12.

<Comparative Example 1> Production Process of Lithium Phosphate, pH 9

Lithium phosphate was produced in the same manner as in Example 1, except that in step 2 of Example 1, the pH was adjusted to 9.

<Comparative Example 2> Production Process of Lithium Phosphate, pH 13

Lithium phosphate was produced in the same manner as in Example 1, except that in step 2 of Example 1, the pH was adjusted to 13.

<Comparative Example 3> Production Process of Lithium Phosphate, pH 13.5

Lithium phosphate was produced in the same manner as in Example 1, except that in step 2 of Example 1, the pH was adjusted to 13.5.

<Example 4> Production Process of Lithium Phosphate, 70° C.

Lithium phosphate was produced in the same manner as in Example 1, except that in step 3 of Example 1, the temperature was raised to 70° C.

<Example 5> Production Process of Lithium Phosphate, 90° C.

Lithium phosphate was produced in the same manner as in Example 1, except that in step 3 of Example 1, the temperature was raised to 90° C.

<Comparative Example 4> Production Process of Lithium Phosphate, 50° C.

Lithium phosphate was produced in the same manner as in Example 1, except that in step 3 of Example 1, the temperature was raised to 50° C.

<Comparative Example 5> Production Process of Lithium Phosphate, 100° C.

Lithium phosphate was produced in the same manner as in Example 1, except that in step 3 of Example 1, the temperature was raised to 100° C.

<Comparative Example 6> Production Process of Lithium Phosphate, pH 8

Lithium phosphate was produced in the same manner as in Example 1, except that in step 2 of Example 1, the pH was adjusted to 8.

<Comparative Example 7> Production Process of Lithium Phosphate, pH 7

Lithium phosphate was produced in the same manner as in Example 1, except that in step 2 of Example 1, the pH was adjusted to 7.

<Comparative Example 8> Production Process of Lithium Phosphate, 60° C.

Lithium phosphate was produced in the same manner as in Example 1, except that in step 3 of Example 1, the temperature was raised to 60° C.

<Comparative Example 9> Production Process of Lithium Phosphate, 25° C.

Lithium phosphate was produced in the same manner as in Example 1, except that in step 3 of Example 1, the temperature was raised to 2555° C.

<Experimental Example 1> Comparison of the Recovery Rate of Lithium According to pH Adjustment The lithium content according to the pH adjustment of the lithium phosphate produced in Examples 1 to 3 and Comparative Examples 1 to 3, 6 and 7 was compared based on the lithium content of the initial waste solution and a relative value of the amount of sodium hydroxide (NaOH) used was compared, and the results are shown in Table 1 and FIG. 3 below.

TABLE 1

| | pH of step 1 | Used amount of sodium hydroxide (relative comparison compared to pH 11) | Concentration of filtrate after Li recovery (ppm) | Lithium content of lithium phosphate with respect to waste solution lithium |
|---|---|---|---|---|
| Example 1 | 11 | 1.00 | 169 | 95 wt % |
| Example 2 | 10 | 0.81 | 441 | 87 wt % |
| Example 3 | 12 | 1.60 | 151 | 95 wt % |
| Comparative Example 1 | 9 | 0.67 | 1130 | 66 wt % |
| Comparative Example 2 | 13 | 5.25 | 236 | 93 wt % |
| Comparative Example 3 | 14 | 10.00 | 424 | 87 wt % |
| Comparative Example 6 | 8 | 0.55 | 1570 | 52 wt % |
| Comparative Example 7 | 7 | 0.39 | 1760 | 47 wt % |

Figure 3:
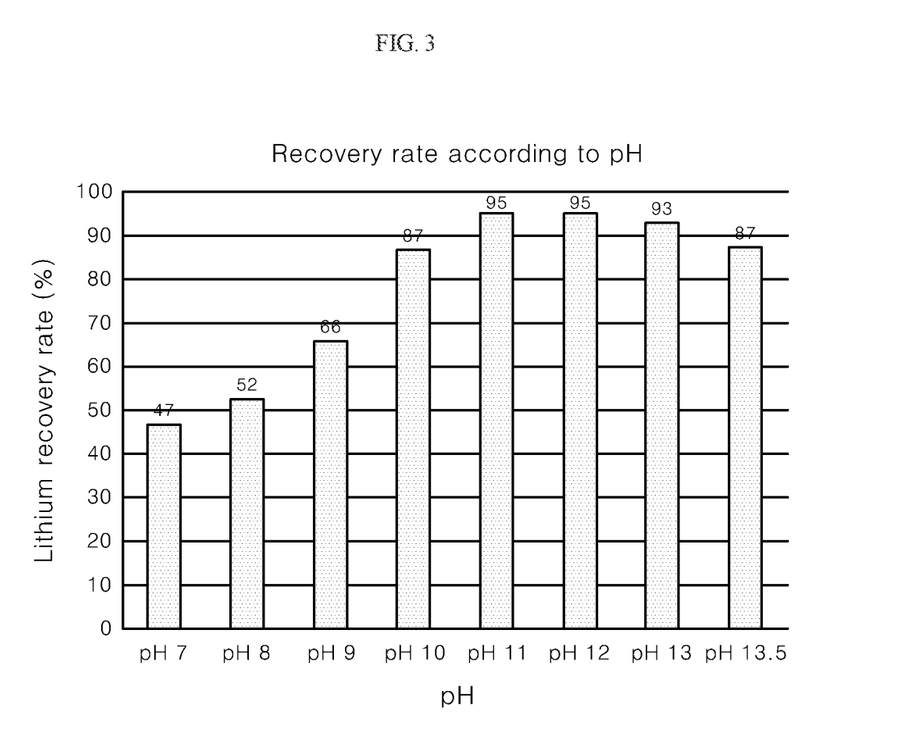
FIG. 3 is a graph showing the lithium content of lithium phosphate with respect to waste solution lithium by pH adjustment of the present invention.

As shown in Table 1 and FIG. 3, in Examples 1 to 3, in which the pH was adjusted to 10 to 12 through sodium hydroxide in step 2, the lithium content of lithium phosphate produced were all 94 wt % or more with respect to the waste solution lithium, and Example 1 with the pH adjusted to 11 was found to show the best lithium recovery rate. On the other hand, Comparative Example 1 in which the pH was adjusted to 9 showed a lower value, and Comparative Examples 2 and 3 in which the pH was adjusted to 13 and 13.5 were lower in recovery rate than in Example 1, and sodium hydroxide was used excessively in an amount of 5~10 times more than that of Example 1, thereby causing the process cost to increase and resulting in an adverse effect of increase in wastewater treatment costs. The reason why the recovery rates of Comparative Examples 2 and 3 are lowered is because, as described above, a part of lithium is produced as lithium hydroxide due to the excessive amount of sodium hydroxide added, and lithium is dissolved again due to solubility of lithium hydroxide, resulting in an increase in lithium concentration in the lithium recovered filtrate.

Figure 4:
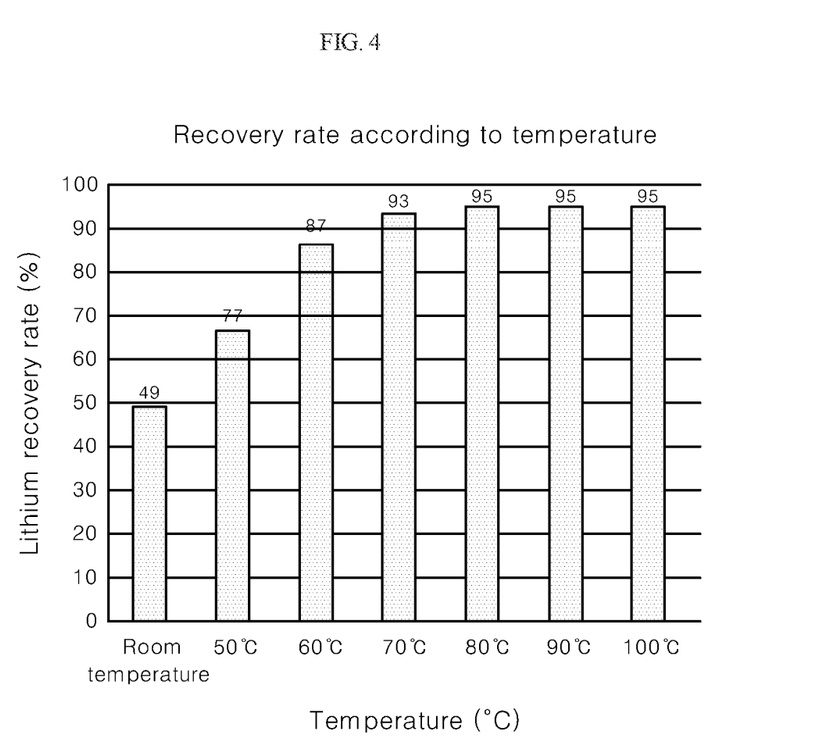
FIG. 4 is a graph showing the lithium content of lithium phosphate with respect to the waste solution lithium through temperature-raising temperature control of the present invention.
Figure 5:
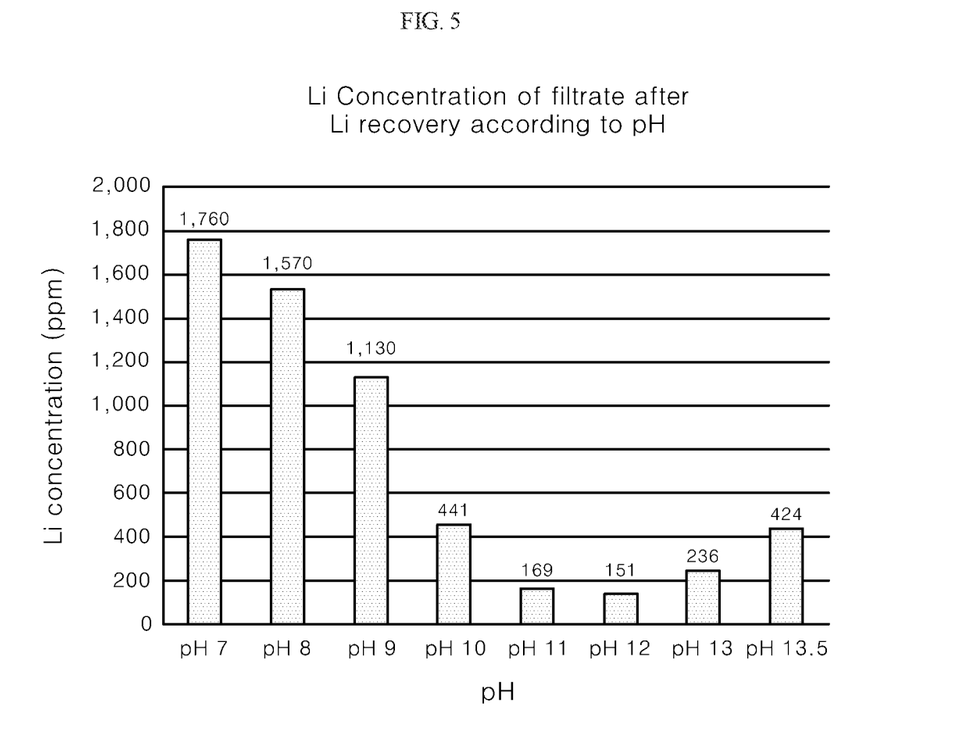
FIG. 5 is a graph showing the lithium concentration of the filtrate after recovering lithium phosphate through pH adjustment of the present invention.
Figure 6:
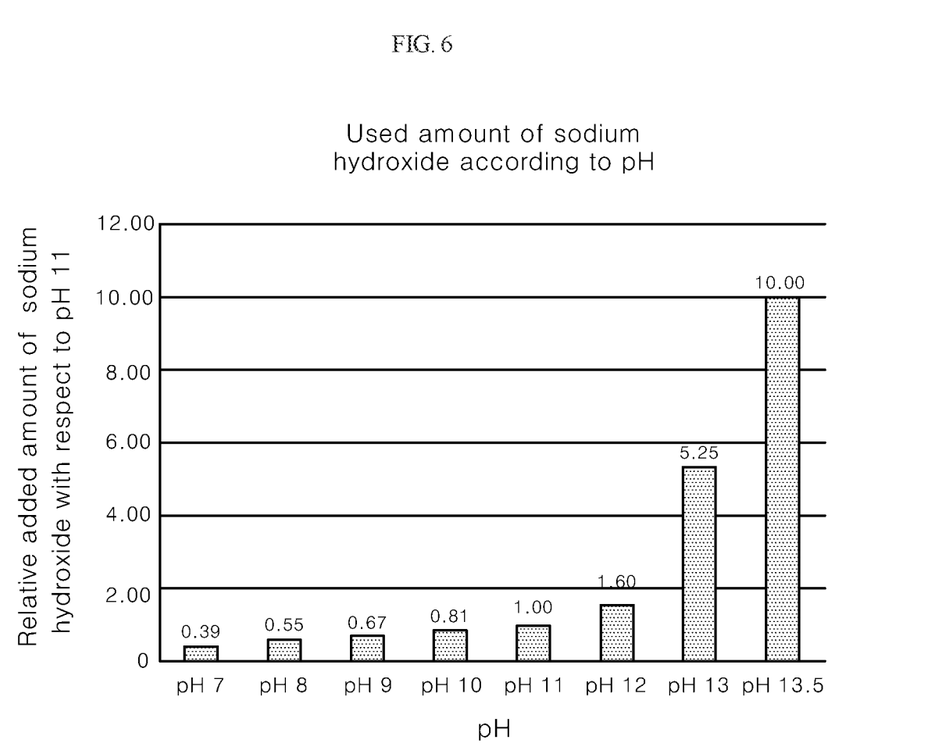
FIG. 6 is a graph showing the relative comparison of the amounts of sodium hydroxide (NaOH) used in the pH adjustment of the present invention with pH 11 being the standard.
Figure 7:
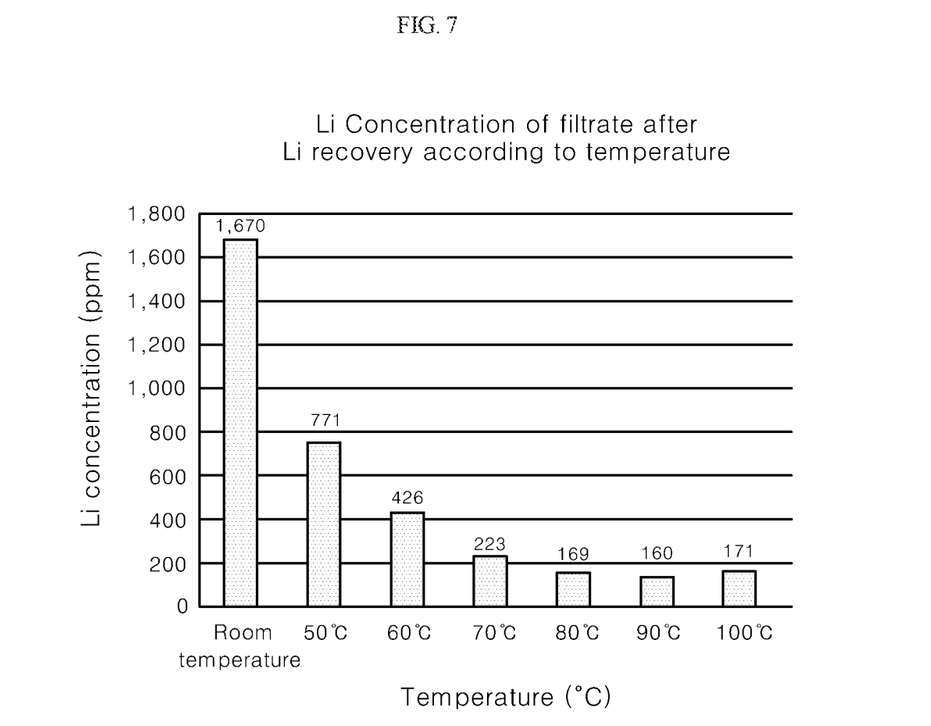
FIG. 7 is a graph showing the lithium concentration of the filtrate after recovering lithium phosphate through temperature-raising temperature control.

<Experimental Example 2> Comparison of Lithium Recovery According to Raised Temperature The lithium contents of the lithium phosphate produced in Examples 1, 4 and 5 and Comparative Examples 4, 5, 8 and 9 were compared based on the lithium content of a waste solution and the results are shown in Tables 2 and 4 below.

TABLE 2

|  | Raised temperature of step 3 (° C.) | Concentration of filtrate after Li recovery (ppm) | Lithium content of lithium phosphate with respect to waste solution lithium |
|---|---|---|---|
| Example 1 | 80 | 169 | 95 wt % |
| Example 4 | 70 | 223 | 93 wt % |
| Example 5 | 90 | 160 | 95 wt % |
| Comparative Example 4 | 50 | 771 | 77 wt % |
| Comparative Example 5 | 100 | 171 | 95 wt % |
| Comparative Example 8 | 60 | 426 | 87 wt % |
| Comparative Example 6 | 25 | 1670 | 49 wt % |

As shown in Table 2 and FIG. 4, in Examples 1, 4 and 5 in which the raised temperature in step 3 was adjusted to 70 to 90° C., it was shown that the lithium content of lithium phosphate produced were all 93 wt % or more with respect to waste solution lithium, and Comparative Example 5 at 100° C. shows a similar recovery rate as that of Example 1, but shows a poor result in terms of efficiency relative to the energy cost for raising the temperature. In Comparative Example 4, in which the temperature was raised to 50° C., it was confirmed that the lithium recovery rate was lowered, and this seems to be due to the solubility of lithium phosphate being inversely proportional with temperature wherein the solubility becomes lower as the temperature is higher and becomes higher as the temperature is lower.

Although a specific embodiment of the lithium phosphate producing method has been described above, it is apparent that various modifications can be made without departing from the scope of the present invention.

Therefore, the scope of the present invention should not be construed as being limited to the embodiments described, but should be determined by equivalents to the appended claims, as well as the following claims.

That is, it is to be understood that the foregoing embodiments are illustrative and not restrictive in all aspects and that the scope of the present invention is indicated by the appended claims rather than the foregoing description, and it is intended that all changes and modifications derived from the equivalent concept be included within the scope of the present invention.

What is claimed is:

1. A method for producing lithium phosphate from a lithium solution, comprising the steps of,
preparing a mixture in which a phosphorus-containing material is added to a lithium solution in step 1;
adding a basic solution to the prepared mixture to adjust the pH to 10 to 12 in step 2;
and making the pH-adjusted mixture react by raising its temperature and filtering to recover lithium phosphate in step 3.

2. A method of claim 1, wherein the lithium solution of step 1 is a waste solution of a waste lithium battery.

3. A method of claim 1, wherein the lithium concentration of the lithium solution of step 1 is 1.5 g/L to 6.0 g/L.

4. A method of claim 1, wherein the phosphorus-containing material of step 1 comprises phosphoric acid ($H_3PO_4$) or phosphate.

5. A method of claim 1, wherein the phosphorus-containing material addition ratio of step 1 is 0.8 to 1.2 times a lithium equivalent of the lithium solution.

6. A method of claim 1, wherein the basic solution of step 2 is a basic solution comprising one or more selected from a group consisting of sodium hydroxide (NaOH), potassium hydroxide (KOH), magnesium hydroxide ($Mg(OH)_2$) and calcium hydroxide($Ca(OH)_2$).

7. A method of claim 1, wherein the addition of the basic solution of step 2 is performed such that the pH of the mixture is 10.5 to 11.5.

8. A method of claim 1. wherein the temperature rise in step 3 is performed by raising the temperature to 70° C. to 90° C. and a reaction is made by maintaining the temperature for 30 minutes to 90 minutes after raising the temperature.

9. A method of claim 1, wherein the filtration of step 3 recovers lithium phosphate containing 85 wt % to 98 wt % of lithium with respect to lithium in the lithium solution of step 1.

10. A method for producing lithium phosphate from a lithium solution, comprising the steps of,
preparing a mixture in which phosphoric acid is added to a lithium solution in step i;
adding a basic solution to the prepared mixture to adjust the pH to 10 to 12 in step ii; and
making the pH-adjusted mixture react by raising its temperature to 70° C. to 90° C. and filtering to recover lithium phosphate in step iii.

11. A method for producing lithium phosphate from a waste solution from a waste battery containing lithium, comprising the steps of,
preparing a mixture in which phosphoric acid is added 0.8 to 1.2 times the lithium equivalent of a waste solution of a waste lithium battery containing lithium at a concentration of 1.5 g/L to 6.0 g/L, to the waste solution in step a;
adding sodium hydroxide to the prepared mixture to adjust the pH to 10 to 12 in step b; and
raising the temperature of the pH-adjusted mixture to 70° C. to 90° C. and making it react for 30 to 90 minutes and filtering to recover lithium phosphate containing 85 wt % to 98 wt % of lithium with respect to lithium in the waste solution of step a in step c.

12. Lithium phosphate produced through the method of claim 11, wherein the lithium phosphate comprises 85 wt% to 98 wt% of lithium with respect to the lithium content in the lithium waste solution which is a starting material at the time of the production.

* * * * *

UNITED STATES PATENT AND TRADEMARK OFFICE
CERTIFICATE OF CORRECTION

PATENT NO. : 10,566,664 B2
APPLICATION NO. : 15/692266
DATED : February 18, 2020
INVENTOR(S) : Byun et al.

Page 1 of 1

It is certified that error appears in the above-identified patent and that said Letters Patent is hereby corrected as shown below:

In the Claims

Column 10, Line 23: Claim 9, Delete "filtration" and insert -- filtering --

Signed and Sealed this
Twenty-fourth Day of March, 2020

Andrei Iancu
*Director of the United States Patent and Trademark Office*